United States Patent [19]

Coursen

[11] 4,126,005
[45] Nov. 21, 1978

[54] INORGANIC CEMENT GROUTING SYSTEM FOR USE IN ANCHORING A BOLT IN A HOLE AND COMPARTMENTED PACKAGE FOR USE THEREWITH

[75] Inventor: David L. Coursen, Mercersburg, Pa.

[73] Assignee: E. I. Du Pont de Nemours and Company, Wilmington, Del.

[21] Appl. No.: 830,473

[22] Filed: Sep. 6, 1977

[51] Int. Cl.$^2$ .................. E21D 20/02; C04B 7/02
[52] U.S. Cl. .................................... 405/261; 106/90; 166/293
[58] Field of Search .............. 61/45 B, 39; 166/293; 206/219; 106/89, 90, 95; 175/72, 68, 64

[56] References Cited

U.S. PATENT DOCUMENTS

| 2,800,963 | 7/1957 | Roberts et al. | 166/293 |
| 3,126,958 | 3/1964 | Bearden et al. | 166/293 |
| 3,197,428 | 7/1965 | Siegele | 166/293 X |
| 3,212,269 | 10/1965 | Olsen | 61/45 B X |
| 3,385,427 | 5/1968 | Stouls | 61/45 B X |
| 3,861,522 | 1/1975 | Llewellyn et al. | 206/219 |
| 4,024,918 | 5/1977 | Crinkelmeyer | 166/293 |

FOREIGN PATENT DOCUMENTS

| 224,588 | 11/1962 | Austria | 61/45 B |
| 1,293,620 | 10/1972 | United Kingdom | 61/45 B |

*Primary Examiner*—Dennis L. Taylor

[57] ABSTRACT

In a method of anchoring a reinforcing member such as a rock bolt in a hole, e.g., in a mine roof, wherein two separate components of an inorganic cement grouting system are mixed, preferably in the hole, e.g., by the rotation of the reinforcing member, whereby the components react to form a hardened grout around the reinforcing member, the two components of the system delivered into the hole are: (1) a slush or sludgy mass of a particulate inorganic cement, e.g., an hydraulic cement, and a liquid which is nonreactive therewith, preferably a hydrocarbon, and (2) a liquid, e.g., water, which is reactive with the cement; and a particulate aggregate such as sand preferably is present in the cement slush and/or the reactive liquid. The inorganic cement constitutes more than 10 percent, and the weight of any aggregate present is no more than about 80 percent, of the total weight of the two components. The two components preferably are delivered into the hole separately, e.g., from separate feeding conduits or, more preferably, in separate compartments of a frangible package, which is broken by the penetration and rotation of the reinforcing member.

The cement composition in slush form and controlled aggregate content impart lubricity to the system for easy insertion and rotation of a reinforcing member, and make the cement component and the combined components pumpable through small-diameter passageways, while permitting the development of an adequate pull strength in the hardened grout formed around the reinforcing member when the mixed components react.

15 Claims, 2 Drawing Figures

INORGANIC CEMENT GROUTING SYSTEM FOR USE IN ANCHORING A BOLT IN A HOLE AND COMPARTMENTED PACKAGE FOR USE THEREWITH

BACKGROUND OF THE INVENTION

1. Field of the Invention

The present invention relates to an inorganic cement grouting system and a compartmented package for use therewith in a method of anchoring a reinforcing member in a hole, e.g., in a mine roof, wherein reactive inorganic cement components are introduced into a hole and allowed to react and harden therein around a reinforcing member so as to fix it firmly in the hole.

2. Description of the Prior Art

Anchor bolts are employed in various fields of engineering, for example as strengthening or reinforcing members in rock formations and in structural bodies. The bolts are inserted into drill holes in the formation or body, and often are fixed or anchored therein, at their inner end or over substantially their entire length, by means of a reactive grouting composition which hardens around the bolt. For mine roof support, grouting compositions which harden and attain maximum strength rapidly are needed. Reactive compositions which have been used include inorganic cement mortars and hardenable synthetic resins, and these have been introduced into the drill holes through a feed pipe, or in cartridged form. In the latter case, the reactive components, e.g., a polymerizable resin formulation and a catalyst which catalyzes the curing of the resin, are introduced into the hole in separate cartridges or in separate compartments of the same cartridge. A rigid bolt penetrates, and thereby ruptures, the cartridge(s) and the package contents are mixed by rotation of the bolt. The grouting mixture hardens around the bolt so as to anchor it in place.

In the case of inorganic cements, the pumping of a prepared hydraulic cement mortar into a hole after a bolt is in position therein has been described, as has the driving of a bolt into hydraulic cement mortar in a hole. In the former case, complete and uniform filling of the space around the bolt is difficult to ensure; and, in the latter case, the bolt has to be installed immediately after the mortar has been introduced, so that it is not feasible to fill a large number of holes with the mortar first and subsequently to introduce the bolts, a more efficient procedure.

Cartridged hydraulic cement systems for anchoring rock bolts are described in U.S. Pat. No. Re. 25,869, British Pat. Nos. 1,293,619 and 1,293,620, and German OLS No. 2,207,076. In these systems the components of an hydraulic cement mortar are introduced into a drill hole in separate compartments of an easily destructible cartridge. One component of the system, i.e., the hydraulic cement, is placed in one of the compartments in the dry particulate state, i.e., as a dry powder or grit; and the other component, i.e., water, is placed in the other compartment. The cartridge is broken and the components are mixed by driving and rotating the bolt therein. The cartridged system has the advantage that bolts can be installed in the holes at any time after the introduction of the reactive components because the components are kept separated until the installation of the bolt. Also, such a system requires no complex pumping equipment at the site of use.

U.S. Pat. No. Re. 25,869 discloses the use of a glass cylinder filled with a dry Portland cement/sand mixture which has embedded therein a glass capsule containing water and a rapid-hardening agent, e.g., calcium chloride, to shorten the hardening time.

British Pat. Nos. 1,293,619 and 1,293,620 describe the use of a cartridge consisting of inner and outer rigid brittle tubes having at least one end that is readily frangible, the space between the two tubes containing a mixture of Portland cement and high alumina cement, and the inner tube containing water. The addition of an aggregate, e.g., sand or copper slag, a gelling agent, and a wetting agent to the water also is disclosed.

In German OLS No. 2,207,076, the particulate material in one compartment is gypsum, preferably mixed with a strength-enhancing cement, to which an inert filler such as styrofoam may be added. The use of a gelling agent to increase the viscosity of the water in the other compartment also is disclosed.

Although inorganic cement grouting systems are economically attractive in contrast to resin-curing systems, generally are not plagued with such problems as instability on storage as are resin-curing systems, cement grouting systems wherein one of the components is a dry cement present certain difficulties in use, especially when applied to the fixing of bolts in drill holes. When compartmented cartridges are used, the bolt must be inserted into the cartridge and penetrate its full length if the components are to be mixed properly. This insertion is difficult to achieve with cartridges containing a dry cement component. The magnitude of the force required to achieve the necessary insertion may exceed the capability of standard bolting equipment available in the working location, e.g., in a mine. Also, the insertion force required with such cartridges may cause the bolt to buckle.

Another problem with the cartridged dry cement component system of the prior art is that the cement component is easily vulnerable to premature hardening should ambient moisture or water from the other compartment penetrate the cartridge seals or packaging material, a situation which could arise on storage or during transportation of cartridges. Lastly, the prior art bolt-anchoring systems employing inorganic cement are not well-suited for use in the uncartridged form, where compact pumping equipment and accurate metering are desirable to deliver the components to the drill hole.

U.S. Pat. No. 3,324,663 describes the reinforcement of rock formations with a two-component resin composition based on (a) an unsaturated polymerizable polyester (alkyd) resin mixed with a monomeric polymerizable ethylenic compound and (b) a cross-linking peroxide catalyst system. A water-reactive filler such as Portland cement or plaster of Paris (5–10 percent of the final composition) is incorporated in either the resin component or the catalyst component, and water is incorporated in the component not containing the water-reactive filler. The water-reactive filler and water are used to modify the basic resin/catalyst system, the presence of water during the curing of the resin being disclosed as causing an imperfect cure and minimizing shrinkage. Water-reactive fillers (up to 5 percent) have been disclosed (U.S. Pat. No. 2,288,321) to shorten the curing time of alkyd resins by reacting with the water formed during curing.

In the grouting system of U.S. Pat. No. 3,324,663, the reactants essential for the formation of a hardened grout are totally organic, i.e., an alkyd resin and a liquid ethylenic monomer, and they are cartridged together in the same compartment, i.e., premixed, the resin being dissolved in the ethylenic monomer and reacting therewith when the separately packaged catalyst is mixed in. Only about 5-10 percent of the total composition is water-reactive filler. The preponderance of resin and catalyst in this system, and the basic resin-curing reaction that occurs, over-ride and obscure any possible secondary reaction involving the water-reactive filler.

SUMMARY OF THE INVENTION

The present invention provides an improvement in a grouting system for use in a hole in combination with a reinforcing member wherein a hardened grout is formed around the reinforcing member in the hole by the reaction of two mixed components of an inorganic grouting composition, thereby anchoring the reinforcing member in the hole. The improvement in the grouting system of the invention comprises an inorganic grouting composition having (a) as a first component, a slush or sludgy mass of a particulate inorganic cement, e.g., an hydraulic cement, and a liquid, such as a hydrocarbon, which is nonreactive therewith, and, (b) as a second component, separated from the first, a liquid, e.g., water, which is reactive with the inorganic cement in the first component, the inorganic cement constituting more than 10 percent of the total weight of components (a) and (b). A particulate aggregate such as sand preferably is present in one or both of the components in an amount such as to constitute about from 20 to 80 percent of the total weight of components (a) and (b).

In a method of anchoring a reinforcing member in a hole by means of the improved grouting system of the present invention, the two separate components of the inorganic grouting composition are brought together and mixed, preferably in the hole, e.g., by the rotation of the reinforcing member, and allowed to react in the hole to form a hardened grout around the reinforcing member therein. In a preferred grouting system and anchoring method of the invention, the two components are delivered into the hole separately by virtue of their being maintained in a frangible compartmented package adapted to be inserted into the hole and subsequently broken therein by the penetration of the reinforcing member therethrough, and the package contents brought together and mixed by rotation of the reinforcing member. The invention also provides such a package contaning (a) in a first compartment, a slush or sludgy mass of a particulate inorganic cement in a liquid which is nonreactive therewith, and (b) in a second compartment, separated from the first, a liquid which is reactive with the inorganic cement in the first compartment, the inorganic cement constituting more than 10 percent of the weight of the total package contents. A particulate aggregate such as sand preferably is present in the first and/or second compartments in an amount such as to constitute up to about 80 percent of the weight of the total package contents.

In a preferred grouting system and anchoring method of the invention, which finds particular use in the reinforcement of mine roofs wherein the grouting composition has to set up fast enough to provide high strength in a very short time, grouting compositions are employed which harden relatively rapidly, e.g., compositions containing calcinated gypsum or Very High Early Strength cement (described in U.S. Pat. No. 3,860,433) in the first component and water as the second component, or wherein the cement in the first component is an alkaline earth metal oxide and the second component is a phosphoric acid or phosphate solution.

The term "inorganic cement" as used herein to describe the particulate solid reactant in the first component or package compartment denotes a particulate inorganic composition that sets up and hardens to a strong, dense monolithic solid upon being mixed with a liquid and allowed to stand. The term includes hydraulic cements, i.e., those that are capable of setting and hardening without contact with the atmosphere due to the interaction of the constituents of the cement rather than by the evaporation of a liquid vehicle or by reaction with atmospheric carbon dioxide or oxygen. Examples of such cements are Portland cements, high-alumina cements, pozzolanas, and gypsum plasters, which set up when mixed with water; lead oxide, which sets up when mixed with glycerin; as well as the more rapid-setting metal oxide compositions, e.g., magnesium oxide, which set up rapidly when mixed with phosphoric acid or phosphate solutions. The fast setting reaction that occurs between metal oxides such as magnesium oxide and phosphates or phosphoric acid is well-known, and is described, for example, in U.S. Pat. Nos. 3,285,758, 3,821,006, 3,879,209, 3,923,534, 3,923,525 and 3,960,580, and German OLS No. 25 53 140. The term "slush" as used herein to describe the first component of the grouting composition denotes a solid-liquid combination of mud-like or sludgy consistency. The term includes solid-liquid combinations of varying degrees of mobility, but in all cases denotes combinations that are readily pumpable.

The term "liquid" as used herein to describe the second component of the grouting composition which is reactive with the inorganic cement in the first component is used in the conventional sense to denote single-phase materials as well as solutions. Also, the reactivity of this liquid with respect to the cement may be produced in situ when the components are brought together, as will be described hereinafter.

The nonreactivity of the liquid in the slush which constitutes the first component or which is present in the first package compartment refers to the substantial inertness of this liquid with respect to the solid cement and other materials present therein. Such liquid may, however, be reactive with a material in the second component or compartment, and may have some influence on the setting time and ultimate strength of the grout.

BRIEF DESCRIPTION OF THE DRAWING

In the accompanying drawing, which illustrates specific embodiments of the compartmented package and inorganic cement grouting system of the invention.

DETAILED DESCRIPTION

In the method and system of this invention, an inorganic cement is maintained in the form of a slush or sludgy mass together with a liquid with which it does not react, e.g., an inert nonaqueous liquid, preferably a hydrocarbon, in the case of a cement that sets by hydration; and the slush is brought together and mixed, preferably in a drill hole, with a reactive liquid, e.g., water in the case of a cement that sets by hydration, and allowed to react in the hole around a reinforcing member. Cement in slush form has several advantages over the dry cement used in previous rock bolt packages. First, the nonreactive liquid imparts lubricity to the cement so that, when the two components of the grouting composition are packaged in a compartmented cartridge, a bolt can be inserted into the cartridge easily and rapidly. Also, the nonreactive liquid, if substantially immiscible with the reactive liquid, helps to reduce the possibility of the premature setting of the cement as a result of contact with the reactive liquid or its vapors, e.g., ambient moisture, during storage or handling, thereby affording a longer shelf life to the cartridged system. In addition, use of the cement in slush form enables the cement component to be metered accurately and handled in compact pumps for ease of packaging in high-speed form-fill machinery as well as for on-site feed operations. The cement component in slush form also is advantageous in that it is adapted to be delivered intermittently in relatively small quantities as is required for bolt anchoring in holes.

The combining of the inorganic cement with a nonreactive liquid in accordance with the present invention, while effectively isolating and fluidizing the cement prior to use, surprisingly does not prevent the interaction of the cement and reactive liquid after they have been mixed, relatively short setting and hardening times and acceptable strengths being attainable despite the initial presence of the nonreactive liquid around the particles of cement. The time required to reach acceptable strength and the magnitude of the ultimate strength attainable under a given set of conditions will vary, however, depending on the particular combination of cement composition and reactive liquid employed in the system, mechanical conditions, etc.

A wide variety of liquids can be used as the slush-forming liquid with the cement in the first component of the grouting composition. The specific choice in any given case will be made on the basis of the nature of the cement, the setting and strength-development time required with the slush-forming liquid, and the latter's cost. Liquid hydrocarbons and mixtures (which must be essentially anhydrous for use with cements that set by hydration) containing such hydrocarbons are particularly advantageous from the point of view of setting time as well as cost, and therefore are preferred. A substantially nonvolatile liquid is preferred to assure stability under varying conditions of storage and use. For this reason, liquids boiling above about 25° C. at atmospheric pressure are prefered. Thus, preferred hydrocarbon slush-forming liquids are 5-25 carbon atom aliphatic hydrocarbons such as hexanes, heptanes, and octanes; and aromatic hydrocarbons such as benzene and alkyl benzenes, e.g., toluene and xylene. Aromatic or aliphatic hydrocarbon mixtures such as gasoline, naphtha, kerosene, paraffin oil, diesel fuel, fuel oils, lubricating oils, vegetable oils, e.g., linseed, tung, cottonseed, corn, and peanut oils, and crudes such as petroleum and shale oil also can be employed. For use in coal mines, the liquid in the slush must have a flash point above 100° F., and should be low in volatile aromatics.

Although low-viscosity slush-forming liquids are preferred, thick liquids such as asphalt, grease, e.g., hydrocarbon oils thickened with soaps or other viscosity modifiers; animal fats, e.g., lard; and hydrogenated vegetable oils also can be used alone or combined with lower-viscosity liquids.

The cement also can be combined with an alcohol, e.g., methanol, isopropanol, butanol, sec-butyl alcohol, amyl alcohol, glycol, or glycerol; a ketone, e.g., acetone o methyl ethyl ketone; an ester, e.g., dibutyl phthalate or acetyl tributyl citrate; dimethyl sulfoxide; or dimethylformamide; but the setting time of cement from slushes with these compounds generally is much longer than that from slushes with hydrocarbons.

The slush-forming liquid is inert with respect to the cement, and in the case of cements which set by hydration is substantially anhydrous, and preferably water-immiscible. The latter property affords maximum shelf life, preventing the cement from setting should the slush accidentally come into contact with water prior to use.

The liquid which is reactive with the inorganic cement can be a single-phase material such as water, or a solution. For example, when the cement is a refractory metal oxide such as magnesium oxide, which reacts rapidly with phosphoric acid or aqueous phosphate solutions to form a hard product, the reactive liquid will be an aqueous solution of phosphoric acid or one or more of the phosphates described in the aforementioned patents related to phosphate cements. The reactivity of this liquid can be produced in situ when the components are brought together, e.g., by the dissolving of solid phosphorus pentoxide, present in the first component, in water, present in the second component.

A particulate aggregate, preferably sand, may be present in a controlled amount as a filler in one or both of the components of the grouting composition. In general, aggregate greatly enhances the shear strength of the hardened grout and therefore is preferred. Other aggregate materials which can be used include particles of competent rocks or rock-forming minerals such as limestone, calcite, granite, basalt, dolomite, andesite, feldspars, amphilboles, pyroxenes, olivine, iron oxides, gabbro, rhyolite, syenite, diorite, dolerite, peridotite, trachyte, obsidian, quartz, etc., as well as materials such as vitrified clay, slag, cinders, fly ash, glass cullet, and fibrous materials such as chopped metal (preferably steel) wire, glass fibers, asbestos, cotton, and polyester and aramide fibers. Sands having different particle shapes and sizes can be used. Because of the need to be packed in a narrow annulus, the particles should have a minimum dimension no larger than about 1 mm. Mixtures of different aggregates also can be used.

For a given system, the shear strength of the hardened grout increases with increasing aggregate content up to about 60–70 percent by weight based on the total weight of the two components. At the same time, however, mixing of the components becomes increasingly difficult as the aggregate content increases. Also, too high an aggregate content, e.g., 90 percent or more based on the total weight of the grout, results in a brittle, impact-sensitive product which is of no use for anchoring a reinforcing member in a hole. Therefore, while an aggregate content of up to about 80 percent can be employed, a content above about 70 percent is not preferred on the basis of ease of mixing and because there is little if any shear strength increase to be gained by exceeding 70 percent. Also, an aggregate/cement weight ratio in the range of about from 1/1 to 4/1 is preferred. Usually at least about 20 percent, and preferably at least about 40 percent, of the total weight of the two components will be aggregate.

The manner in which the aggregate is distributed between the reaction components has no significant effect on the shear strength of the hardened grout. Thus, 100 percent of the aggregate can be in the cement slush or 100 percent in the reactive liquid. Alternatively, the aggregate can be distributed in any other proportions, e.g., 1/1, between the two reaction components. The specific aggregate distribution in any given case usually will be selected on the basis of that which gives a desired viscosity balance and ease of mixing. In a system in which the components are pumped and mixed at the site of use, it may be more convenient to include the aggregate in only one of the components.

The hardened grout produced around the reinforcing member in the method of this invention forms as a result of the reaction between the inorganic cement in the first component and the liquid in the second component. Organic resin-curing systems are not required, and the reactant(s) which undergo a hardening reaction therefore are substantially all-inorganic. The development of strength in the hardened grout sufficient to anchor a bolt securely in place in a hole in a mine roof, and provision of the components in a form such that they can be delivered and mixed conveniently, require a balance of the content of inorganic cement, slush-forming liquid, reactive liquid, and aggregate, if present. On this basis, although it is possible to make a marginally satisfactory grout from compositions containing 5–10 percent cement, in order to provide maximum strength capability it is preferred that the amount of cement constitute more than 10 percent of the total weight of the two components. Sufficient reactive liquid should be present to react with the cement, e.g., sufficient to give a water/cement weight ratio of at least about 0.1, and preferably at least about 0.3 in the case of cements that set by hydration. In order to be able to allow for the incorporation of a sufficient amount of aggregate and reactive liquid into the system, the amount of cement will not exceed about 80 percent of the total weight of the two components; and a maximum cement content of about 50 percent is preferred inasmuch as no advantage in terms of final strength is seen in exceeding this amount.

The specific amounts of liquids used in the two components will depend on the amount of solids present, ease of delivery, mixing, etc. From strength considerations, it is undesirable to exceed significantly the stoichiometric amount of reactive liquid and the amount of slush-forming liquid required to give the necessary lubricity and deliverability (e.g., pumpability). A liquids/solids weight ratio of the combined components in the range of about from 0.1 to 0.6 is satisfactory from the viewpoint of strength, and handling and mixing considerations. In accordance with these considerations, the water/cement weight ratio in cement systems that set by hydration generally will not exceed about 1.0, preferably 0.7; and the amount of water, based on the total weight of the two components will be about from 2 to 50, and preferably 5 to 30 percent. Also, the amount of slush-forming liquid (nonreactive liquid in the first component) will vary about from 5 to 50, preferably 10 to 20, percent of the total weight of the two components; or about from 10 to 50 percent, preferably 13 to 28 percent, of the weight of the cement.

The reactive liquid in the second component of the grouting composition used in the present invention preferably is in thickened form. This reduces the chance that the liquid will run out of an upward-slanting hole or soak into fissures or pores in the hole wall. Also, the thick liquid may imprt a lubricating effect to the reactive liquid component, thereby facilitating the insertion of a bolt therein, which effect is especially advantageous when an aggregate is suspended in the liquid, the aggregate having less tendency to settle or pack in the thick liquid. If the reactive liquid is not per se sufficiently thick, a thickening agent can be added. The thickening agent is a solid material that absorbs water, is hydratable, or is somewhat water-soluble, and can be an inorganic material such as a clay or fumed silica, or an organic material. Organic thickening agents that can be used include carboxymethylcelluloses, polyvinyl alcohols, starches, carboxy vinyl polymers, and other mucilages and resins such as galactomannans (e.g., guar gum), polyacrylamides, and polyethylene oxides.

The amount of thickening agent in the reactive liquid component depends on the specific material used, and specifically on the degree of thickening of the liquid component attainable therewith, a function generally of the molecular weight and degree of substitution of the material, and depends also on other solid materials which may be incorporated in the reactive liquid component. Generally, the amount of thickeneing agent will be in the range of about from 0.01 to 5 percent of the total weight of the two reaction components, the lower end of the range being used with materials of higher molecular weight and/or having more hydrophilic groups. In the case of the organic polymers, more than bout 0.2 percent, based on the total weight of the two reaction components, usually will not be necessary.

One or more surface-active agents can be incorporated into the reaction system, in either one or both of the components. A surface-active agent in the cement slush or in the reactive liquid component containing suspended sand particles produces the consistency of a smooth paste, which results in improved ease of mixing of the components. The surface-active agent should be soluble in the liquid of the component in which it is used, and should give a hydrophilic-lipophilic balance value of about from 8 to 14, as determined according to the methods outlined in "The Atlas HLB System", Atlas Chemical Industries, Inc., 1962. Only about 0.01 to 1.0 percent of surface-active agent is needed based on the total weight of the two components. However, since the presence of a surface-active agent can result in a hardened grout of lower shear strength, it is necessary to assess what effect, if any, the surfactant under consideration has on strength, and to balance this finding against the advantage to be gained in ease of mixing. Surfactants which can be used include sorbitan monooleate and monolaurate, polyoxyethylene monooleate and hexaoleate, polyoxyethylene sorbitan trioleate and monolaurate, and polyoxyethylene tridecyl ether. Of these, all are oil-soluble except the polyoxyethylene sorbitan esters, which are water-soluble, although the tridecyl ether is only sparingly soluble in oil.

Figure 1:
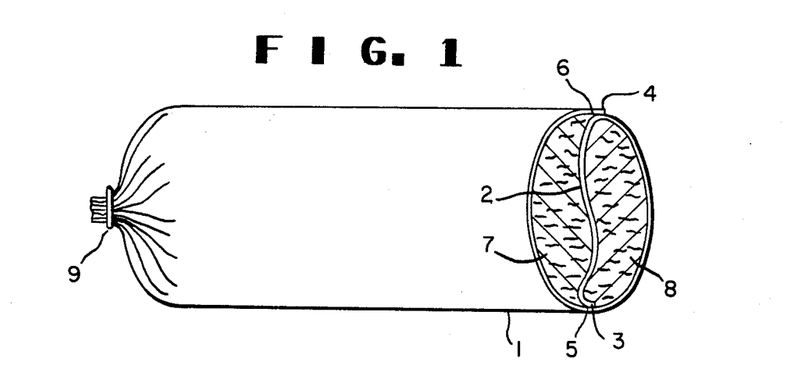
FIG. 1 is a perspective view of a portion of a compartmented package of the invention, which package has been cross-sectioned in the transverse direction so as to reveal more fully the internal structure thereof.

The present grouting system can be used wherever structure reinforcement is required, e.g., in rock bolting or roof bolting in coal or metal mines, or to secure bolts in holes drilled in concrete structures. While the system may itself provide the reinforcement without a bolt, it finds its greatest advantage in bolt anchoring because anchored bolts give better reinforcement and because a bolt or the like may be used in any case to mix the components in the drill hole. In one embodiment, the components of the system are delivered to the drill hole by pumping through separate feeding conduits communicating with the hole either prior to or after the bolt has been inserted, preferably before bolt insertion. The pumped components can be brought together and mixed just outside the hole, at the hole opening, or in the hole. Preferably, however, they are pumped separately into the hole and mixed therein. A preferred system comprises a frangible compartmented package having the two components in separate compartments, one such package being shown in FIG. 1. In FIG. 1, a tubular member 1 of substantially circular transverse cross-section and a diaphragm 2 are constructed by wrapping a single web of pliable film material in a manner such as to form a convoluted tube having a partially single-ply and partially double-ply wall, the inner ply of the double-ply wall portion forming diaphragm 2. The two plies of the double-ply portion are sealed together near inner edge 3 and outer edge 4 of the web so as to form linear junctures or seals 5 and 6, resepctively. Tubular member 1, diaphragm 2, and junctures 5 and 6 define two separate compartments 7 and 8. At each end of the compartmented tubular member, one of which is shown in FIG. 1, the end portions of tubular member 1 and of diaphragm 2 are collectively gathered together and closed by closure means 9. Compartment 8 is filled with Component A described in Example 1 which follows, and compartment 7 with Component B described in the same example.

In use, this package is inserted into a drill hole, and a bolt is forced into the package, tearing the film and penetrating a part or the full length of the package. The components are mixed by rotation of the bolt, and subsequently react with hardening so as to secure the bolt in the hole.

The invention will now be illustrated by way of the following examples. Parts are by weight.

EXAMPLE 1

A two-component reaction system of the following composition was made:

| Component A | Component B |
|---|---|
| 19.05% cement | 0.12% polyacrylamide |
| 28.57% sand | 28.57% sand |
| 11.43% oil | 12.26% water |

The percentages are percent of the ingredients by weight, based on the total combined weight of the two components. The cement was "Very High Early Strength" (VHE) cement, manufactured by U.S. Gypsum, a fast-setting hydrualic cement described in U.S. Pat. No. 3,860,433. The sand was Ottawa Silica Company's "Banding Sand" characterized by a surface area of 160 $cm^2/g$. The oil was kerosene. The slush of cement, sand, and oil was kept separated from the thickened water/sand combination. For strength testing, the two components were mixed to substantial homogeneity, whereupon oil was exuded therefrom, and the resulting paste-like composition hardened.

The shear strength of the grout, measured after 24 hours, was 4800 psi. The method of measurement was the following:

A sample of the freshly mixed grout was placed on polyethylene terephthalate film, and a stainless steel ring, 0.625 inch (15.9 mm) in diameter and 0.115 inch (2.92 mm) high, was placed on the grout. A piece of polyethylene terephthalate film was placed over the ring, and the latter then was pressed evenly into the grout by means of a block of wood. The resulting "shear button" of the grout was placed on an Instron testing machine (conforming to ASTM Method E4, Verification of Testing Machines), and tested (24 hours after mixing) for shear strength by the method fo ASTM D732. In this test, a plunger was brought down onto the grout at a rate of 0.5 inch (12.7 mm) per minute. The shear strength was calculated from the applied force to cause failure, according to the following equation:

$$\text{shear strength (psi)} = \frac{\text{Force (lbs)}}{\text{Specimen thickness} \times \pi \times \text{diam. of punch}}$$

The grout also was evaluated after 24 hours in terms of its average pull strength, i.e., 1.26 tons/inch (450 kg/cm), according to the following procedure:

Freshly mixed grout was placed in a section of 1-inch (2.54 cm) threaded pipe, and a standard 0.625-inch (1.59-cm) diameter steel blunt reinforcing rod was inserted into the grout. The excess grout which was squeezed out during insertion of the rod was scraped off, and the pipe-rod assembly was placed into a test fixture mounted in an Instron Universal Testing Machine. The rod was then pulled (24 hours after the mixing of the grout) by applying a measured upward force to the bolt while the pipe section of the pipe-rod assembly was held stationary in the fixture. The force in tons at which the first discontinuity in the recorded force vs. deflection curve was observed was the pull strength.

EXAMPLE 2

Four dual-compartment frangible packages in the form of 18-inches (46 cm)-long, 0.9-inch (2.3 cm)-diameter "chub" cartridges as described in U.S. Pat. Nos. 3,795,081 and 3,861,522 and as is shown in FIG. 1 herein, and containing a two-compartment reaction system of the invention, were made from a web of polyethylene terephthalate film. One compartment contained a slush of the cement, sand, and oil described in Example 1. The other compartment contained water and the sand and thickener described in Example 1. The ingredients content based on the total combined weight of the contents of the two compartments was as follows:

| | Cartridges a and b | Cartridges c and d |
|---|---|---|
| cement | 34% | 32% |
| oil | 13% | 13% |
| sand | 31.4%* | 30.2%** |
| water | 21.6% | 24.8% |
| thickener | 0.10% | 0.10% |

*26% in the cement slush; 5.4% in the water
**24% in the cement slush; 6.2% in the water Each sealed cartridge was placed in a one-inch (2.54 cm)-diameter steel pipe having a rough wall and a welded closure at one end (simulated drill hole). The pipe was held in an upright position in a vise with the closed end uppermost. A headed reinforcing rod (bolt) 0.625 inch (15.9 mm) in diameter was inserted into the cartridge with a rotating upward motion, and spun at 300 rpm to mix the contents of the package. A washer closed off the bottom end of the pipe. Ambient temperature was 80° F. After one hour the pull strength of the grout was determined by applying force to the headed end of the bolt in a downward direction at a rate of 0.5 inch (1.27 cm) per minute. The results are shown in the following table:

| Cartridge | Mixing Time (sec) | Force Required To Cause Slippage |
|---|---|---|
| a | 7.5 | 11.2 tons (10 × 10³ kg) |
| b | 20 | 13.2 tons (10.6 × 10³ kg) |
| c | 7.5 | 10 tons (8 × 10³ kg) |
| d | 17.5 | 10.2 tons (8.2 × 10³ kg) |

EXAMPLE 3

Figure 2:
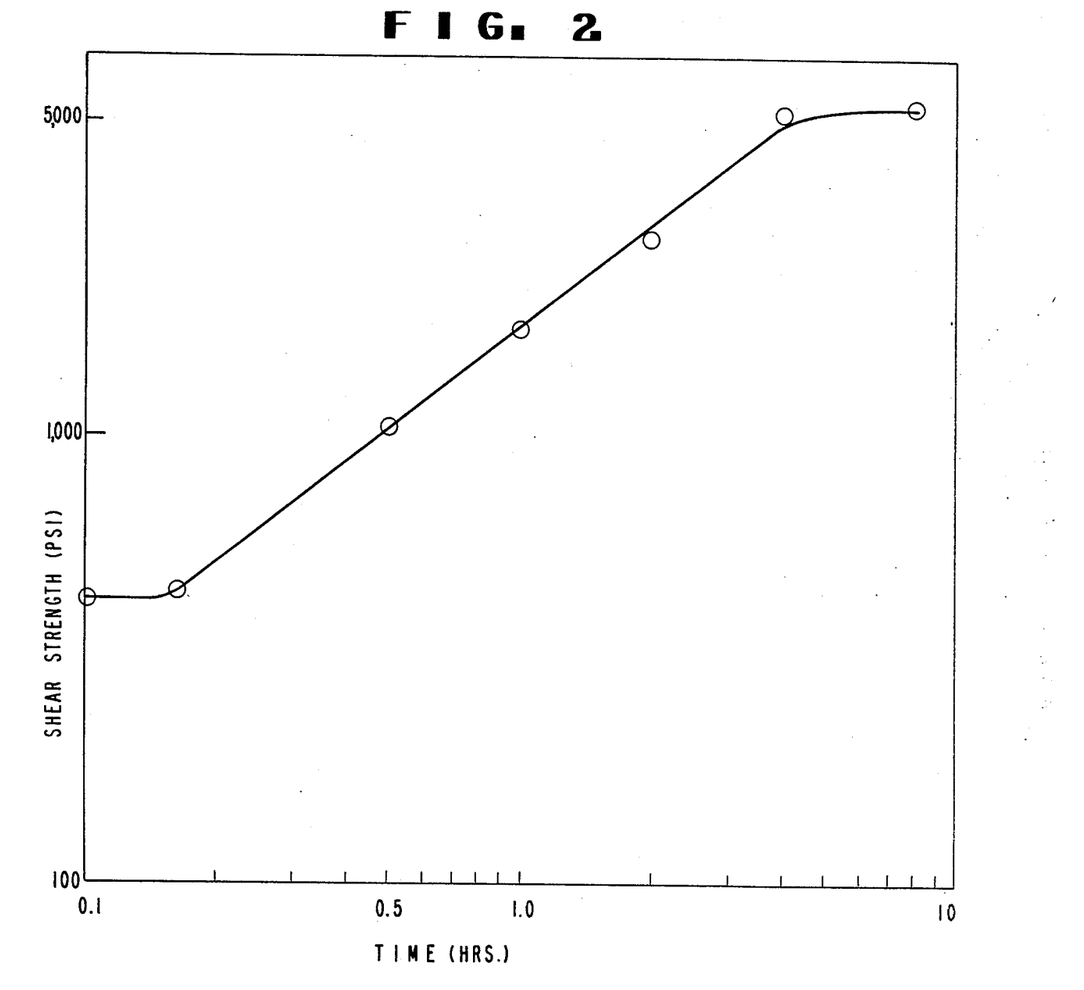
FIG. 2 is a plot of shear strength vs. time of an hydraulic cement-water system of the invention.

A cement-oil slush and an aqueous sand mixture in the proportions 28.57% cement, 14.29% oil, 42.86% sand, and 14.29% water (same cement, oil, and sand as described in Example 1) were mixed thoroughly, and shear buttons prepared from the freshly mixed grout as described in Example 1. The buttons were tested for shear strength after seven different periods of time, according to the procedure described in Example 1. The results are shown in FIG. 2, where shear strength is plotted vs. time on a logarithmic scale. It is seen that this grout achieved a shear strength of 1000–2000 psi (equivalent to the strength of coal mine roof strata) in 30 to 90 minutes, and well over 90 percent of its full strength (equivalent to the strength of metal mine roofs) in less than 4 hours.

EXAMPLE 4

The following separate components were prepared:

| Component A (parts) | Component B (parts) |
|---|---|
| cement (26.32) | sand (19.74) |
| sand (19.74) | 1% aqueous solution of |
| oil (14.47) | polyacrylamide (19.74) |

The sand and oil were the same as those used in Example 1. Four different mixes of Component A were prepared, each with a different cement. The 24-hour shear strength of the grout prepared by mixing each one of the four A Components with Component B was measured as described in Example 1. The results were as follows:

| Cement in Component A | Shear Strength (psi) |
|---|---|
| VHE Cement | 2100 |
| Ordinary Portland (Type II) | ~66 |
| "Rapid Rock" (Tamms Industries Co.) | ~50 |
| "Red Line" (Tamms Industries Co.) | ~16 |

EXAMPLE 5

The effect of sand content on the 24-hour shear strength of the grout was examined with a system wherein 28.6 parts of the cement described in Example 1 and 14.3 parts of the oil described in Example 1 formed one component, and 14.3 parts of a 1 percent aqueous polyacrylamide solution formed the other component, and an amount of sand was divided evenly between the two components. The results are shown in the following table:

| Parts Sand (%) | Shear Strength (psi)* |
|---|---|
| 0 | 3059 |
| 10 (14.9) | 3461 |
| 20 (26) | 4196 |
| 50 (46.8) | 10531 |

EXAMPLE 6

A reaction system in which 18.7 percent cement and 13.1 percent oil (same cement and oil as in Example 1) were in Component A, 12.1 percent of a 1 percent aqueous solution of polyacrylamide was in Component B, and 56.1 percent sand (the sand used in Example 1) was located as indicated in the following table, was tested for shear strength as described previously:

| | 24-hr Shear Strength (psi) |
|---|---|
| 100% in Component A | 4670 |
| 100% in Component B | 4115 |
| { 50% in Component A<br>50% in Component B } | 4164 |

These results show that the distribution of sand between the components has no significant effect on the shear strength of the hardened grout inasmuch as all of the values are within ± 10 percent of the average value, a deviation possibly due to experimental error in the test precedure.

EXAMPLE 7

Fibrous materials were added to the cement-oil slurry in the following experiments.

(a) A grout made by mixing a cement-oil slush containing 28.49 parts VHE cement, 14.25 parts of the oil described in Example 1, and 0.28 part of 0.5–1 inch long glasswool fibers with an aqueous sand suspension containing 42.74 parts of the sand described in Example 1, 14.25 parts of water, and 0.14 part of polyacrylamide, had a 1-day shear strength (method of Example 1) of 4150 psi. The same slurry without the glasswool gave a grout having a 1-day shear strength of 3360 psi.

(b) The 4-hour shear strength of a grout made by mixing 40.61 parts VHE cement and 18.27 oil (same as that of Example 1) with 20.30 parts sand (same as that of Example 1) and 20.30 parts of a 1 percent aqueous solution of polyacrylamide was increased from 1400 psi to 1750 psi by the addition of 0.51 percent of 0.5-inch long Kevlar ® (aramide) fibers to the cement slush.

EXAMPLE 8

Different organic liquids were tested as slush-forming liquids by combining 20 parts of VHE cement with 10 parts of the liquid being tested, adding 10 parts of water to the resulting slush, mixing the cement and water components, and testing the resulting grout qualitatively for hardness. The results were as follows:

| Slush-Forming Agent | Grout Characteristics |
|---|---|
| pentane | hard in ~7 min |
| hexane | hard in ~7 min |
| heptane | hard in ~7 min |
| benzene | hard in ~5 min |
| toluene | hard in ~10 min |
| xylene | hard in ~7 min |
| gasoline | hard in ~8 min |
| fuel oil #2 | hard in ~9 min |
| kerosene | hard in ~6 min |
| Nujol | hard in ~23 min |
| methanol | hard in ~7 hr |

When the above-described procedure was followed without the addition of a slush-forming liquid, the grout became hard in 5 minutes.

EXAMPLE 9

One of the benefits achieved by employing the cement in the form of a slush was studied by comparing the force required to insert a bolt into the slush as contrasted to that needed to penetrate a dry cement. A 1-inch (2.54-cm)-inner-diameter steel pipe was filled with the cement component, and a 0.625-inch (15.9-mm)-diameter steel reinforcing rod was moved downward into the component in an Instron machine at a rate of 20 inches (51 cm) per minute. A force of only about 0.5 pound (0.2 kg) was required to penetrate one inch (2.5 cm) of a slush consisting of 44.44 percent cement, 33.33 percent sand, and 22.22 percent oil:

| Oil | Force |
|---|---|
| Napoleum 470* | 0.6 lb |
| Circosol 410** | 0.5 lb |

*A kerosene, predominantly aliphatic
**A naphthenic based oil (Sun Oil Company)

In contrast, a force of 4000 pounds (maximum available on the Instron machine) was required to insert the bolt about one inch deep into a mixture of 57.1 parts dry cement and 42.9 parts sand.

EXAMPLE 10

This example shows the beneficial effect of the thickening agent in the water component when sand is present therein. When the procedure described in Example 9 was employed with a 66.7 percent sand/33.3 percent water mixture, a force of 4000 pounds was required to insert the bolt 1–1.5 inches. When 1 part of polyacrylamide was added to 100 parts of the water used to make the sandwater mixture, a force of only 0.5 to 143 pounds per inch of insertion was required even when the sand-/water ratio was 75/25.

Essentially the same results were obtained when polyethylene oxide was substituted for polyacrylamide.

EXAMPLES 11–15

A surfactant (0.2 part) was added to a grout of the following composition:

| Component A | Component B |
|---|---|
| VHE cement (19.76 parts) | sand* (29.64 parts) |
| sand* (29.64 parts) | 1% aqueous solution of |
| oil* (7.90 parts) | polyacrylamide (12.85 parts) |

*Same as in Example 1

The grouts obtained upon mixing of Components A and B were tested after 24 hours for shear strength as described in Example 1. In all cases in which a surfactant was employed, the component containing the surfactant was a smooth paste, and mixing was easy.

EXAMPLE 16

The following components were prepared:

| Component A | Component B |
|---|---|
| VHE cement (31.16 parts) | sand* (46.74 parts) |
| oil* (6.23 parts) | 1% aqueous solution |
| Span 80** (0.12 part) } HLB = 9.1 | polyacrylamide |
| Tween 85 (0.16 part) | (15.58 parts) |

*Same as in Example 1
**Sorbitan Monooleate

Component A (113 parts) and Component B (187 parts) were packed into the separate compartments of the polyethylene terephthalate film cartridge described in Example 2. The cartridged grout was subjected to a pull strength test in a simulated drill hole as described in Example 2. 24 hours after the components had been mixed, the pull strength of the hardened grout was 12 tons.

EXAMPLE 17

Temperature was found to have an effect on the strength development pattern of the cement grout system of the invention. Different samples of a grout prepared from the following components were tested for shear strength after 7 hours at 5°, 23°, 40°, 60°, and 100° C., respectively, according to the procedure described in Example 1:

| Component A (parts) | Component B (parts) |
|---|---|
| VHE cement (19.05) | sand* (28.57) |
| sand* (28.57) | 1% aqueous solution of |
| oil* (9.52) | polyacrylamide (14.29) |

*Same as in Example 1

The results were as follows:

| Temp. (° C) | Shear Strength (psi) |
|---|---|
| 5 | 1090 |
| 23 | 2000 |
| 40 | 4100 |
| 60 | 3300 |
| 100 | 2100 |

A sample of the mixed components held at 5° C. developed shear strengths of 3530 and 5000 psi after 24 hours and 7 days, respectively; and a sample held at 23° C. developed shear strengths of 3550 and 3540 psi after 24 hours and 7 days, respectively. Thus, a slightly elevated temperature aids early strength development and would be useful when maximum strength is desired in no more than a few hours; however, the ultimate long-term

| Example No. | Surfactant | Chemical Compound | HLB Value* | Component Contg. Surfactant | 24-hour Shear Strength (psi) |
|---|---|---|---|---|---|
| 11** | none | | | | 3505 |
| 12 | Tween 81 | Polyoxyethylene monooleate | 10 | A | 1901 |
| 13** | Tween 85 | Polyoxyethylene sorbitan trioleate | 11 | B | 1029 |
| 14 | Span 20 | Sorbitan monolaurate | 8.6 | A | 561 |
| 15 | G1086 | Polyoxyethylene hexaoleate | 10.2 | A | 782 |

*Hydrophilic-Lipophilic Balance
**Component A was 19.01 parts cement, 28.52 parts sand, and 11.31 parts oil
Component B was 28.52 parts sand and 12.36 parts polyacrylamide solution strength of heated samples is lower than that of samples stored at lower temperature.

EXAMPLE 18

The following two components were made:

| Component A | Component B |
|---|---|
| Hydrostone* (2000 parts) | Water (1758 parts) |
| Marcol 90 N.F. (369 parts) | Methocel 65 (35 parts) HG (Dow) |
| Light Mineral Oil (Exxon) | |
| Stearic acid (22 parts) | Sodium stearate (114 parts) |

*a commercial cement consisting essentially of calcined gypsum Component A was made by heating a mixture of the oil and stearic acid to 135° F to dissolve the stearic acid, and mixing the resulting solution with the hydrostone in a turbine mixer. Component B was made by heating a mixture of the ingredients to 135° F to dissolve the sodium stearate and produce a thick paste. When Components A and B were mixed in the weight ratio of 6.38/1 A/B, the mixture set up into a solid within a few minutes.

One compartment of a 24-inches (61 cm)-long dual-compartment cartridge described in Example 2 was filled with Component A and the other compartment with Component B in the weight ratio of 6.38 parts of Component A for every part of Component B. The filled cartridge was stored for 10 days and then tested for rock bolt anchoring substantially as described in Example 2. A 30-inch-long rock bolt was inserted into the cartridge at a rate of somewhat less than 4 feet (1.2 meters) per 15 seconds, while the bolt was spun at 450 rpm. The bolt was spun for 5 or 10 seconds after insertion.

When the grouted bolt was pull-tested after 12.5 minutes, no slippage occurred until a force of 9 tons (8200 kg) had been applied.

EXAMPLE 19

A grout sets up rapidly when a cement component consisting of a slush of magnesium oxide, sand, and Circosol 340 (a light-colored process oil) is mixed with an aqueous solution of ammonium diacid phosphate. When mixed in a hole and allowed to react around a bolt, the hardened grout firmly anchors the bolt in the hole.

I claim:

1. A method of anchoring a reinforcing member in a hole in rock strata comprising
   (a) delivering a hardenable inorganic grouting composition into the hole, said grouting composition comprising controlled amounts of at least two components, the first of said components (1) comprising a slush comprising a particulate inorganic cement and a liquid which is nonreactive therewith, and the second of said components (2) comprising a liquid which is reactive with said inorganic cement, said inorganic cement constituting more than 10 percent of the total weight of components (1) and (2); and
   (b) introducing a reinforcing member into said grouting composition in said hole before any substantial hardening of said composition has occurred, whereby grouting composition is forced into an annulus formed between said reinforcing member and the wall of said hole; components (1) and (2) being delivered into said hole in a separated or freshly brought-together condition and intimately mixed substantially without hesitation after having been brought together; whereby the intimately mixed components of the inorganic grouting composition react rapidly around said reinforcing member to form a hardened grout of sufficient strength to firmly anchor said reinforcing member in said rock strata.

2. A method of claim 1 wherein said first and second components are brought together in said hole by delivery thereto from separate feeding conduits, and mixed in said hole by the rotation of said reinforcing member.

3. A method of claim 1 wherein said first and second components are delivered into said hole in a frangible package in which they are located in separate compartments, the package is penetrated and broken by said reinforcing member, and said components are mixed by the rotation of said reinforcing member.

4. In a grouting system for use in a hole in rock strata in combination with a reinforcing member wherein a hardened grout is formed around the reinforcing member in the hole by the reaction of at least two mixed components of a hardenable inorganic grouting composition, thereby anchoring the reinforcing member in the hole, said components being adapted to be forced into an annulus formed between said reinforcing member and the wall of said hole by the introduction of said reinforcing member into said components before any substantial hardening of said composition has occurred, the improvement comprising an inorganic grouting composition comprising controlled amounts of at least two components, the first of said components (a) comprising a slush comprising a particulate inorganic cement and a liquid which is nonreactive therewith, and the second of said components (b), separated from the first, comprising a liquid which is reactive with said inorganic cement, said inorganic cement constituting more than 10 percent by weight of the total weight of components (a) and (b), and said components (a) and (b) being (1) present in the hole, or outside the hole and adapted to be delivered thereto separately or in freshly combined condition; and (2) adapted to be intimately mixed substantially without hesitation after having been combined whereby the mixed components react rapidly to form a hardened grout of sufficient strength to firmly anchor said reinforcing member in said rock strata.

5. A grouting system of claim 4 wherein a particulate aggregate is present in at least one of the components of the grouting composition in an amount such as to constitute about from 20 to 80 percent of the total weight of said components.

6. A grouting system of claim 4 wherein said first and second components are substantially free of curable resin.

7. A grouting system of claim 4 wherein said first and second components are located in separate feeding conduits for separate delivery to said hold.

8. A grouting system of claim 4 wherein said components are located in separate compartments of a frangible package in position in said hole, said package being adapted to be penetrated and broken by the reinforcing member, and said components to be mixed in said hole by the rotation of said reinforcing member, hardened grout forming around said reinforcing member so as to secure it firmly in said hold.

9. A grouting system of claim 5 wherein said inorganic cement is a cement that sets by hydration, and said liquid reactive therewith is water.

10. A grouting system of claim 5 wherein said liquid nonreactive with said inorganic cement is a hydrocarbon, and said aggregate is sand.

11. A grouting system of claim 5 wherein said liquid in said second component is thickened by the presence of a polymeric material therein.

12. A grouting system of claim 9 wherein said grouting composition contains up to about 80 percent cement, about from 2 to 50 percent water, about from 5 to 50 percent hydrocarbon, and about from 20 to 70 percent sand, based on the total weight of the composition, the water/cement weight ratio being about from 0.3 to 0.7, the cement/sand weight ratio being about from 0.25 to 1, and the weight ratio of hydrocarbon to cement being about from 0.1 to 0.7.

13. A grouting system of claim 9 wherein said cement is calcined gypsum.

14. A method of claim 1 wherein a particulate aggregate is present in at least one of the components of the grouting composition delivered into the hole.

15. A grouting system of claim 9 wherein said cement is a Portland cement.

UNITED STATES PATENT OFFICE
CERTIFICATE OF CORRECTION

PATENT NO. : 4,126,005
DATED : November 21, 1978
INVENTOR(S) : David L. Coursen

It is certified that error appears in the above-identified patent and that said Letters Patent are hereby corrected as shown below:

Claim 8, line 1, insert --first and second-- between "said"

and "compo-". Claim 7, line 3, change "hold" to --hole--.

Signed and Sealed this

*Twenty-second* Day of *May 1979*

[SEAL]

*Attest:*

RUTH C. MASON
*Attesting Officer*

DONALD W. BANNER
*Commissioner of Patents and Trademarks*